United States Patent [19]

Wohlfart

[11] 4,250,803
[45] Feb. 17, 1981

[54] DEEP FRYER

[75] Inventor: Kurt Wohlfart, Offenbach, Fed. Rep. of Germany

[73] Assignee: Rowenta-Werke GmbH, Offenbach am Main, Fed. Rep. of Germany

[21] Appl. No.: 51,582

[22] Filed: Jun. 25, 1979

[30] Foreign Application Priority Data

Jul. 29, 1978 [DE] Fed. Rep. of Germany ....... 2833327

[51] Int. Cl.³ .............................................. A47J 37/12
[52] U.S. Cl. ........................................ 99/409; 99/427
[58] Field of Search ................ 99/403, 404, 407, 410, 99/411, 425, 426–427, 409, 421 P; D7/94

[56] References Cited

U.S. PATENT DOCUMENTS

| D. 246,686 | 12/1977 | Boldt | D7/94 |
|---|---|---|---|
| 2,222,314 | 11/1940 | Husk | 99/410 X |
| 2,550,758 | 5/1951 | Bemis | 99/407 X |
| 2,805,314 | 9/1957 | Michaelis | 99/403 X |
| 3,430,553 | 3/1969 | DiPietro | 99/336 |
| 3,463,077 | 8/1969 | Lescure | 99/403 |
| 3,534,677 | 10/1970 | Keathley | 99/411 |
| 4,031,820 | 6/1977 | Reed | 99/407 X |
| 4,103,604 | 8/1978 | Berard | 99/403 X |

FOREIGN PATENT DOCUMENTS 2305992 10/1973 Fed. Rep. of Germany .
2368857 10/1976 France .
318153 2/1957 Switzerland .

Primary Examiner—Stanley N. Gilreath
Assistant Examiner—Arthur O. Henderson
Attorney, Agent, or Firm—George R. Clark; Neil M. Rose; Allen J. Hoover

[57] ABSTRACT

In a deep fryer of a compact, portable type comprising a vessel, a handle, which is mounted to the vessel, a basket, which is adapted to be lowered and raised within the basket, a cover, which fits removably onto the vessel so as to cover the vessel, and means for lowering and raising the basket within the vessel while the vessel remains covered by the cover, wherein the handle has opposite ends mounted pivotally to opposite sides of the vessel, an improvement is disclosed wherein the basket lowering and raising means comprises a pair of pins, each of which is attached to one of the ends of the handle so as to rotate as the handle is pivoted, and which are linked to the basket so as to lower and raise the basket within the vessel as the handle is pivoted oppositely.

5 Claims, 3 Drawing Figures

DEEP FRYER

BACKGROUND OF THE INVENTION

1. Field of the Invention

This invention pertains to a deep fryer of a compact, portable type comprising a vessel, a handle, which is mounted to the vessel, a basket, which is adapted to be lowered and raised within the vessel, and a cover, which fits removably onto the vessel. The deep fryer may be heated electrically and adapted for domestic use.

2. Brief Description of the Prior Art

As frying tends to produce very annoying odors, it is useful to provide a deep fryer of the type noted above with some means for lowering and raising the basket within the vessel while the vessel remains covered. German Auslegeschrift No. 1,679,033, U.S. Pat. No. 3,463,077, U.S. Pat. No. 3,801,331, and U.S. Pat. No. 3,842,725 exemplify known means for lowering and raising the basket as mentioned.

As exemplified in German Auslegeschrift No. 1,679,033, and also in U.S. Pat. No. 3,463,077, such means comprises a fork, which supports the basket from its bottom, a rack, which is attached to the fork, a guide, which is attached to a wall of the vessel and arranged to guide the rack for vertical movement of the rack, and a pinion, which is engaged with the rack. A knob, which is connected to the pinion by a spindle journalled in the wall of the vessel, is rotated manually to move the rack, the fork, and the basket vertically within the vessel.

As exemplified in German Auslegeschrift No. 1,679,033, and also in U.S. Pat. No. 3,463,077, such means has several disadvantages. As the rack, the fork, and the basket are driven from one side of the vessel, there is a tendency of the basket to jam within the vessel. As the wall of the vessel tends to be thin for reasons of cost and ease of fabrication, there is a tendency of the wall to warp and leak, particularly where the guide for the rack is attached. Moreover, it is a great disadvantage that it is difficult to ascertain the level of the basket within the vessel, while the vessel remains covered.

Similar means having similar disadvantages are exemplified in U.S. Pat. No. 3,801,331 and U.S. Pat. No. 3,842,725.

Also, in an electric cooker, which has a vessel and a cover for the vessel, which could be provided with a basket so as to allow its use as a deep fryer, but which lacks any means for lowering and raising a basket within the vessel, it is known to provide a handle, which is mounted pivotally at opposite ends of the handle to opposite sides of the vessel, as exemplified in U.S. Pat. No. 4,052,590 and U.S. Pat. No. 4,115,918.

BRIEF SUMMARY OF THE INVENTION

As mentioned above, this invention pertains to a deep fryer of a compact, portable type comprising a vessel, a handle, which is mounted to the vessel, a basket, which is adapted to be lowered and raised within the vessel, a cover, which fits removably onto the vessel so as to cover the vessel, and means for lowering and raising the basket within the vessel while the vessel remains covered.

In such a fryer, wherein the handle has opposite ends mounted pivotally to opposite sides of the vessel, this invention provides an improvement wherein the basket lowering and raising means comprises a pair of pins, each of which is attached to one of the ends of the handle so as to rotate as the handle is pivoted, and which are linked to the basket so as to lower and raise the basket within the vessel as the handle is pivoted oppositely.

Preferably, each of the pins is connected to the basket through a crank, the cranks are attached to the pins so as to rotate with the pins, and a link is connected pivotally at opposite ends of the link to each of the cranks and to the basket.

Preferably, the basket is provided on each of opposite sides with an arm having a recess opening downwardly, and each of the links is connected to the basket by a stud attached to the same link and engaged in the recess of one of the arms, whereby the basket may be lifted manually from the studs, after the cover has been removed, for easy removal of the basket from the vessel.

Preferably, each of the pins is linked to the basket so as to position the basket intermediately within the vessel when the handle is pivoted to a position wherein a portion of the handle overlies the vessel.

By pivotal movement of the handle, the basket may be lowered and raised within the vessel while the vessel remains covered, and the handle may be positioned so as to enable the vessel to be carried by the handle and hot grease to be poured from the vessel. The level of the basket within the vessel is indicated precisely, by the position of the handle relative to the vessel, even while the vessel remains covered.

Because the basket is driven from opposite sides of the vessel, there is little tendency for the basket to jam within the vessel. Because symmetrical forces are transmitted to the wall of the vessel, there is little tendency for the wall of the vessel to warp or leak. Because the pins may be journalled above normal levels of hot oil in the vessel, additional points of possible leakage may be avoided.

These and other objects, features, and advantages of this invention are evident from a preferred embodiment described below.

DETAILED DESCRIPTION OF PREFERRED EMBODIMENT

Figure 1:
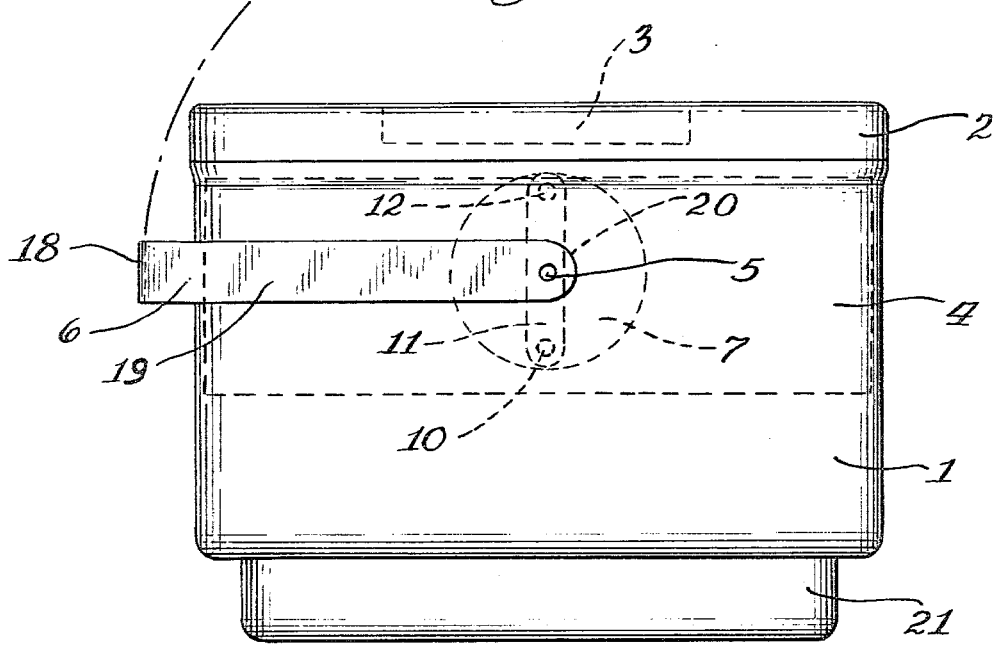
FIG. 1 shows a preferred embodiment of a deep fryer according to this invention and having a basket in a raised position.

As shown in the drawings, a preferred embodiment of a deep fryer according to this invention comprises a vessel 1, which is adapted to contain a bath of hot oil, and a cover 2, which fits removably onto the vessel so as to cover the vessel. A filter 3 of conventional type (see German Auslegeschrift No. 1,679,033 and U.S. Pat. No. 3,463,077, also U.S. Pat. No. 2,790,436) is supported by the cover 2. The vessel 1 and the cover 2 are cylindrical.

An electrical heater 14 of conventional type is mounted to the bottom 13 of the vessel 1 and enclosed by a shroud 21, which is attached integrally to the bottom wall 13 of the vessel 1, and which may be provided with a base support, or feet (not shown) of insulative material. Conventional controls (not shown) may be provided for the electrical heater 14.

Figure 2:
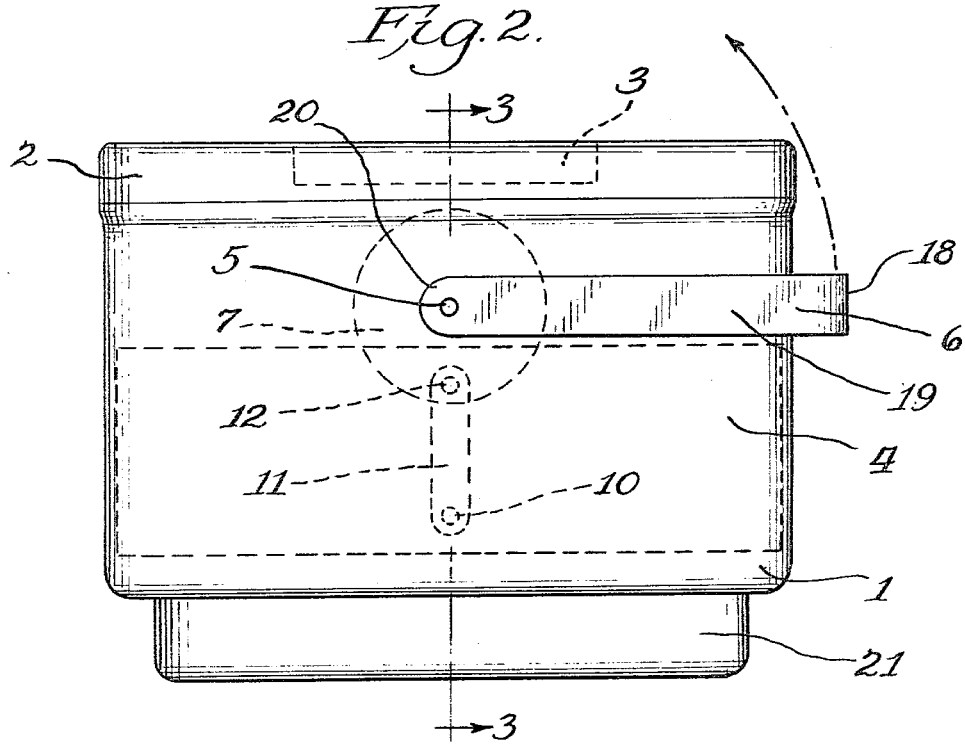
FIG. 2 shows the deep fryer of FIG. 1 having the basket in a lowered position.
Figure 3:
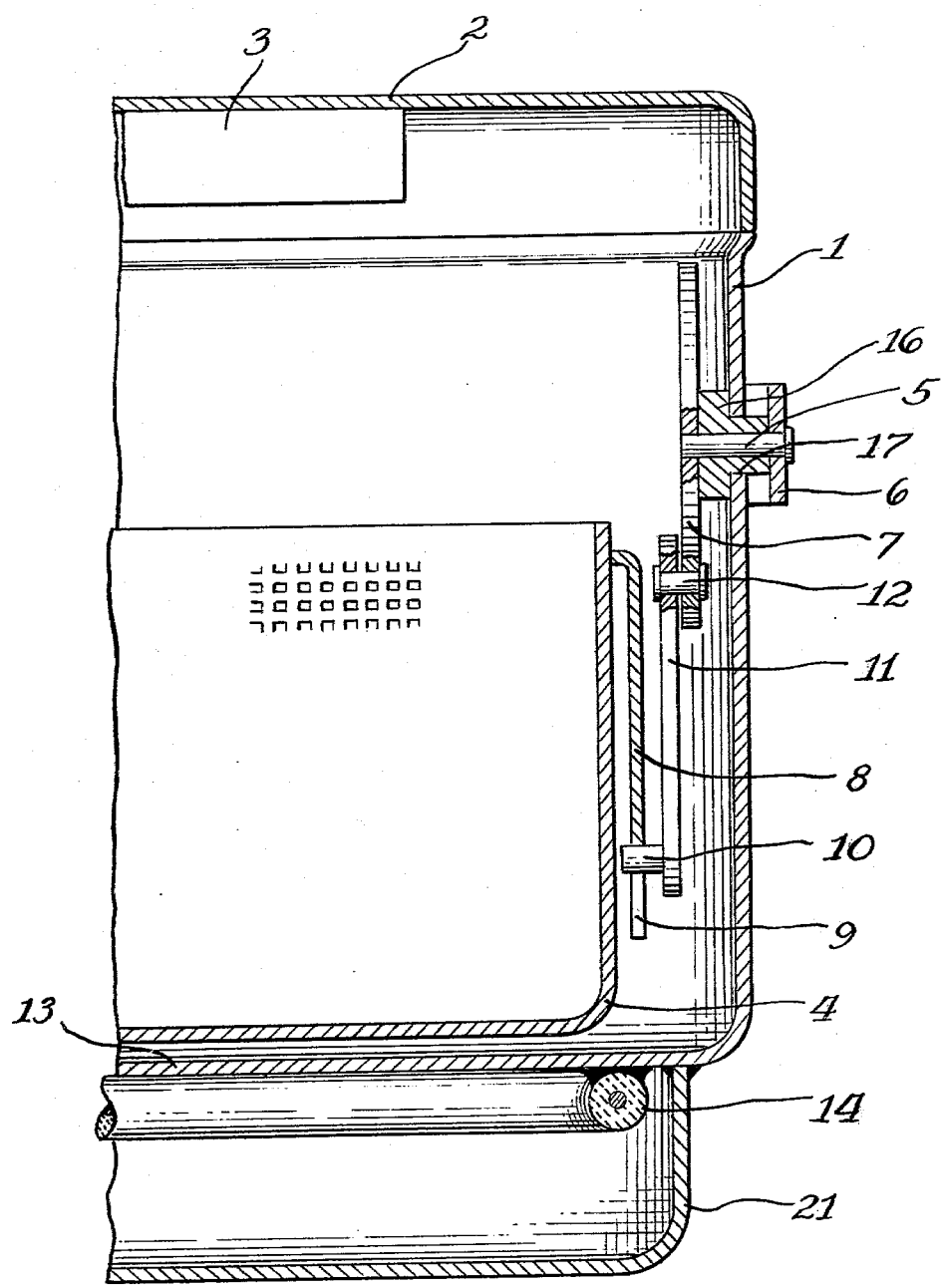
FIG. 3 is a fragmentary section taken on an enlarged scale along line 3—3 of FIG. 2 in the direction of the arrows.

A basket 4, which has perforated side and bottom walls as suggested in FIG. 3, is adapted to be lowered and raised within the vessel 1 while the vessel 1 remains covered, between a lowered position, wherein the basket 4 is shown in phantom lines in FIG. 2, and a raised position, wherein the basket 4 is shown in phantom lines in FIG. 1.

On opposite sides of the vessel 1, and in diametrical opposition to each other, a pair of journal pins 5 are journalled in journal bearings 16, which are seated in suitable openings in the lateral wall 17 of the vessel 1. A handle 6, which is generally U-shaped so as to provide a grip 18 between two arms 19, is mounted pivotally at the ends 20 of the arms 19 to opposite sides of the vessel 1 by the pins 5. Each pin 5 is attached to the end 20 of one of the arms 19 so as to rotate as the handle 6 is pivoted. The pins 5 are linked to the basket 4 so as to lower and raise the basket 4 within the vessel 1 while the vessel 1 remains covered, as the handle 6 is pivoted oppositely, between the positions wherein the handle 6 is shown in FIGS. 1 and 2. As shown in FIG. 3, each of the pins 5 is connected to the basket 4 through a crank 7. The cranks 7 are attached to the pins 5 so as to rotate as the handle 6 is pivoted. A link 11 is connected pivotally at opposite ends of the link 11 to each of the cranks 7 and to the basket 4. Journal pins 12 are used to connect the links 11 to the cranks 7.

The basket 4 is provided on opposite sides with downturned arms 8 (one shown) each of which has a recess 9 opening downwardly. Each link 11 is connected to the basket 4 by a stud 10, which is attached to such link 11, and which is engaged in the recess 9 of one of the arms 8, whereby the basket 4 may be lifted manually from the studs 10, after the cover 2 has been removed, for easy removal of the basket 4 from the vessel 1.

As suggested by FIGS. 1 and 2, the handle 6 may be pivoted over an angle of about 180°, so as to move the basket 4 between the lowered position, wherein the basket 4 is shown in phantom lines in FIG. 2, and the raised position, wherein the basket 4 is shown in phantom lines in FIG. 1. Also, the handle 6 may be pivoted to a vertical position, wherein the basket 4 is positioned intermediately within the vessel 1, so as to enable the vessel 1 to be carried by the handle 6 and hot oil and grease to be poured from the vessel 1. The level of the basket 4 within the vessel 1 is indicated precisely, by the position of the handle 6 relative to the vessel 1, even while the vessel 1 remains covered.

Because the basket 4 is driven from opposite sides of the vessel 1, there is little tendency for the basket 4 to jam within the vessel 1. Because symmetrical forces are transmitted to the wall 17 of the vessel 1, there is little tendency for the wall 17 of the vessel 1 to warp or leak, even if the wall 17 is thin.

The pins 5 are journalled above the level assumed by the top of the basket 4 when positioned in the lowered position of FIG. 2. As normal levels of hot oil in the vessel 1 may be assumed to be lower, additional points of possible leakage thus have been avoided.

I claim:

1. In a deep fryer of a compact, portable type comprising a vessel, a handle, which is mounted to the vessel, a basket, which is adapted to be lowered and raised within the vessel, a cover, which fits removably onto the vessel so as to cover the vessel, and means for lowering and raising the basket within the vessel while the vessel remains covered by the cover, wherein the handle has opposite ends mounted pivotally to opposite sides of the vessel, an improvement wherein the basket lowering and raising means comprises a pair of pins, each of which is attached to one of the ends of the handle so as to rotate conjointly with the other pin as the handle is pivoted, and which are linked to opposite sides of the basket so as to lower and raise the basket within the vessel as the handle is pivoted oppositely while the vessel remains covered by the cover.

2. The improvement of claim 1 wherein each of the pins is connected to the basket through a crank.

3. The improvement of claim 1 wherein each of the pins is connected to the basket through a crank, wherein the cranks are attached to the pins so as to rotate with the pins, and wherein a link is connected pivotally at opposite ends of the link to each of the cranks and to the basket.

4. The improvement of claim 1 wherein each of the pins is connected to the basket through a crank, wherein the cranks are attached to the pins so as to rotate with the pins, wherein a link is connected pivotally at opposite ends of the link to each of the cranks and to the basket, wherein the basket is provided on each of opposite sides with an arm having a recess opening downwardly, and wherein each of the links is connected to the basket by a stud attached to the same link and engaged in the recess of one of the arms, whereby the basket may be lifted manually from the studs, after the cover has been removed, for easy removal of the basket from the vessel.

5. The improvement of claim 1, 2, 3, or 4 wherein each of the pins is linked to the basket so as to position the basket intermediately within the vessel when the handle is pivoted to a position wherein a portion of the handle overlies the vessel.

* * * * *